United States Patent
Viggiano (10) Patent No.: US 10,738,924 B1
(45) Date of Patent: Aug. 11, 2020

(54) COUPLER AND METHOD FOR ATTACHING A DEVICE TO A GARDEN HOSE

(71) Applicant: Alpha Hose LLC, Weston, FL (US)

(72) Inventor: Anthony Viggiano, Groton, CT (US)

(73) Assignee: Alpha Hose LLC, Weston, FL (US)

( * ) Notice: Subject to any disclaimer, the term of this patent is extended or adjusted under 35 U.S.C. 154(b) by 0 days.

(21) Appl. No.: 16/601,557

(22) Filed: Oct. 14, 2019

(51) Int. Cl.
*F16L 33/22* (2006.01)
*F16L 37/092* (2006.01)

(52) U.S. Cl.
CPC .......... *F16L 33/227* (2013.01); *F16L 37/0925* (2013.01)

(58) Field of Classification Search
CPC ..... F16L 33/227; F16L 37/086; F16L 37/091; F16L 37/092
See application file for complete search history.

(56) References Cited

U.S. PATENT DOCUMENTS

| | | | |
|---|---|---|---|
| 3,502,270 A | 3/1970 | Prencipe | |
| 5,911,443 A * | 6/1999 | Le Quere | F16L 37/0915 285/3 |
| 6,540,262 B1 | 4/2003 | Humphreys | |
| 6,964,436 B2 * | 11/2005 | Le Quere | F16L 37/091 285/307 |
| 8,128,130 B2 * | 3/2012 | Robin | F16L 33/227 285/249 |
| 9,841,131 B2 * | 12/2017 | Hagen | F16L 37/0915 |
| 10,082,209 B1 | 9/2018 | Viggiano | |
| 2010/0019488 A1 | 1/2010 | Weimer | |
| 2017/0191593 A1 * | 7/2017 | Le Quere | F16L 37/0925 |

* cited by examiner

Primary Examiner — Eric Keasel
(74) Attorney, Agent, or Firm — C. Nessler (57) ABSTRACT

A valve or other device is attached to the end of a garden hose by means of an adapter that is first attached by swaging to an end of the hose. The adapter has a prong end that is pushed into the bore of the valve and is held there irreversibly by a retaining ring that is carried in a groove of the prong end, to mate with a groove in the bore. An O-ring seal prevents leakage.

20 Claims, 5 Drawing Sheets

COUPLER AND METHOD FOR ATTACHING A DEVICE TO A GARDEN HOSE

TECHNICAL FIELD

The present invention relates to means for attaching a device, such as a valve, to the end of a garden hose or to a like hose.

BACKGROUND

An in-line valve for attachment to a garden hose coupling is described in U.S. Pat. No. 10,082,209 of the present inventor. Such a valve may have an end fitting that enables it to be screwed onto a typical male coupling at the end of a common garden hose, familiarly made of fabric reinforced rubber or thermoplastic. The patented valve has internal parts, including a central plug and a shuttle that moves fore-aft lengthwise relative to the plug. An objective of the present invention is to attach to the end of a garden hose such kind of valve, as well as to attach other valves.

Figure 1:
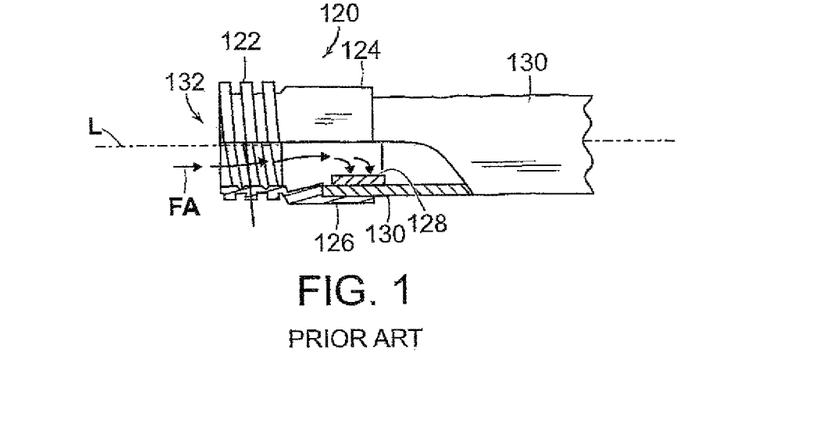
FIG. 1 is a side view with partial cutaway showing a prior art valve attached to a portion of hose.

FIG. 1 shows a typical way in which a coupling 120 has been attached to a garden hose 130, to help illustrate the problem being solved. A fitting on the end of a garden hose, shaped to enable connection of the hose to another hose having a mating reciprocal fitting, is familiarly referred to as a coupling, as it is in this description. (At the same time, the word coupling is used to describe an assembly to two mated fittings, each at the end of a separate piece of hose.)

Coupling 120, which typically is made of brass, has first end 122 that comprises a conventional garden hose male thread. Opposing second end 124 comprises an integral outer wall 126, within which is received the exterior of the end of a portion of a length of rubber or plastic garden hose 130. The coupling has been attached to the hose in the following familiar manner: The end of the garden hose 130 is first inserted into the concavity of wall 126. A ferrule 128 (also called an eyelet or a sleeve) is inserted into the bore of the hose. A bore-swaging tool, often referred to as an internal swage is then inserted into the bore 132 of the fitting from coupling end 122, so the tool working parts reach vicinity of end 124. Then, in a swaging operation carried out by the internal swage (not shown), ferrule 128 is plastically deformed radially outwardly toward the wall 126. Typically, during such an operation, wall 126 is not supported, but it could be supported within a ring-like outer tool. The resultant permanent deformation of the inner wall mechanically and frictionally captures the hose on end 124 of coupling 120. Now, a valve or other device such as a familiar hand held hose spray nozzle may be screw-attached to the threaded end 112 of the coupling.

For marketing and cost reduction purposes, rather than the just-mentioned conventional practice of having a valve attached to a coupling it would be desirable to attach a valve or other device directly to the end of a hose a valve, and perhaps irremovably so. However, attaching of a patented valve or like valve having internal flow path parts can not be accomplished by use of the conventional swaging procedure that was just described. With change in design of the coupling, so there is an integral inner wall and an exterior sleeve, it would be possible to swage the sleeve, but there is an appearance preference in not doing that.

Means of attaching a valve to the end of a hose which do not involve swaging, for instance using adhesive or using some sort of thread attachment are considered less desirable alternatives. Swaging is attractive for its rapidity of manufacture, assurance of obtaining a durable connection, a minimally increased exterior diameter relative to the hose diameter, and esthetics of finished product.

SUMMARY

An object of the present invention is to provide a means and method for attaching a valve or other choice of device directly to the end of a garden hose in a quick, economic, and durable manner with a pleasing appearance. A further object of the invention is to provide a means by which swaging can be used to permanently attach to the end of a piece of hose a valve or other device having a bore configured in a way which prevents the use of a bore-swaging tool inserted into the free or downstream end of the valve or device.

In accord with the invention, an embodiment of assembly for flowing water or other liquid in a lengthwise axis direction comprises a device connected to an adapter. In a further assembly, the end of a hose is optionally connected to the adapter as well. An exemplary device is a valve of the kind described in the Background.

In accord with an embodiment of the invention, a valve device has an inlet end with a cylindrical bore surface portion. The adapter has a first end shaped for attachment to the end of a length of hose and a second end (also called the prong end) exterior surface portion that is shaped to fit closely into the bore of the valve. The bore surface portion of the valve has a first circumscribing groove shaped to receive a portion of a retaining ring (snap ring). The exterior surface portion of the adapter has a circumscribing groove shaped to receive a portion of the same retaining ring. When the adapter second end is sufficiently inserted into the bore of the valve, the two retaining ring grooves become axially mated and a retaining ring positioned in one of the grooves springs radially outward or inward as applies, to thereby irreversibly hold the parts together. An O-ring seal between the valve bore and the adapter prong end prevents lengthwise flow of fluid. Optionally, the retaining ring in a groove is underlain by an L-shape cross section plastic ring. Further, optionally a hose is added by mating the hose end with the adapter and swaging either a portion of the adapter or a separate sleeve radially to thereby fasten the hose to the adapter by the compression force on the hose.

An assembly comprising a hose is formed an embodiment of method of the present invention which comprises first swaging the adapter first end to the end of the hose, putting the retaining ring(s) and seal(s) in place, and axially pushing the adapter second end into the bore of the valve. A conical section in the bore of the valve compresses the retaining ring when it is in the groove on the exterior surface portion of the adapter second end; and with further pushing of the adapter into the valve, the retaining ring springs radially outward into a groove within the valve bore, thereby holding the parts to each other, while permitting subsequent rotation.

The assembly and method meet the objects of the invention. The foregoing characteristics and features of the invention will be appreciated by the drawings and description which follow.

DESCRIPTION

Figure 2:
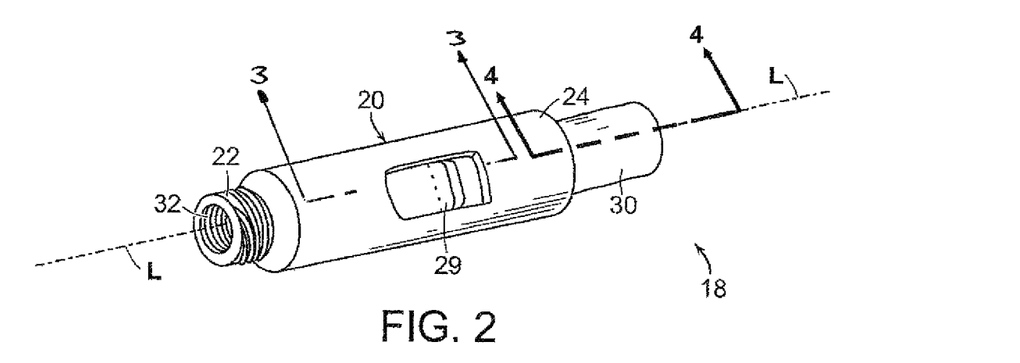
FIG. 2 is a perspective view of an embodiment of an assembly of the present invention.

Assembly 18, an embodiment of the present invention which comprises a valve 20 that is attached to the end of a garden hose 30, is shown in FIG. 2. In this and other examples of the invention, a valve that is being connected to the end of a hose has internal parts like those described in U.S. Pat. No. 10,082,209, the disclosure of which is hereby incorporated by reference. Other kinds of valves and various devices may be connected to hose ends in the generality of the invention, including ball valves and spray nozzles, and other fluid handling devices, including such as lawn sprinklers, flow meters, timer-controlled valves, volume-controlled valve systems, and other kinds of devices.

Exemplary valve 20 of assembly 18 in FIG. 2, which assembly has a length axis L as do other components and assemblies described herein, comprises a male garden hose thread portion at the discharge end 22, to enable connection of some other downstream device, such as another hose or a lawn sprinkler. The valve inlet end 24 is shaped to enable permanent attachment to a plastic or elastomer garden hose in the ways described below. That attachment is enabled by adapter 50 which is hidden from view in the FIG. 2, because it is inside the end 24 of the valve.

Figure 14:
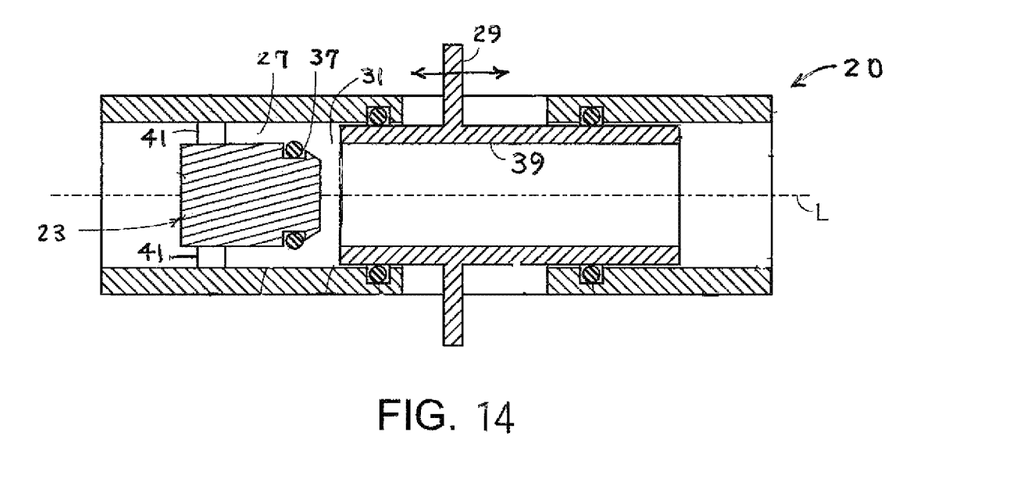
FIG. 14 is a lengthwise cross section of the valve shown in FIG. 1.

As described in U.S. Pat. No. 10,082,209, and illustrated in the FIG. 14 cross section herein, exemplary valve 20 has an internal mechanism comprising shuttle 39 which is moved along the L axis by fore-aft motion of tabs 29 as indicated by the arrow. Flow is thereby controlled as the shuttle alternately mates with and separates from the upstream end of plug 23 which has an O-ring 37 at the nose end, to seal with the bore of the shuttle. The plug is centered in the flow path by struts 41. It is the plug which prevents insertion from the downstream end of the valve of an internal swaging tool, if a craftsman attempts to carry out an attachment of the hose the valve body in a manner similar to that discussed above for the coupling 120.

In an embodiment of the present invention an adapter 50 is first attached to the end of a hose by swaging or other means. Then the adapter is inserted within the bore of the inlet end of the valve, whereupon by means of the designs of the mating body and adapter parts, a portion of the adapter is secured within the valve bore, and thus the hose is secured to the valve for fluid flow along a path through the hose, adapter and valve.

For convenience, the invention is described here in terms of components and elements that each have an inlet end and a discharge end, or they each are characterized analogously as having an upstream end and a downstream end. Such naming or ends should not be treated as a limitation, since it will be understood that in some uses fluid can flow through the components described in an opposite direction.

Several different embodiments of adapters and assemblies are described herein. Parts of one embodiment that correspond with one those of another Figure/embodiment mostly have the same last two digits; thus the corresponding parts may not be repetitively called out.

Figure 3:
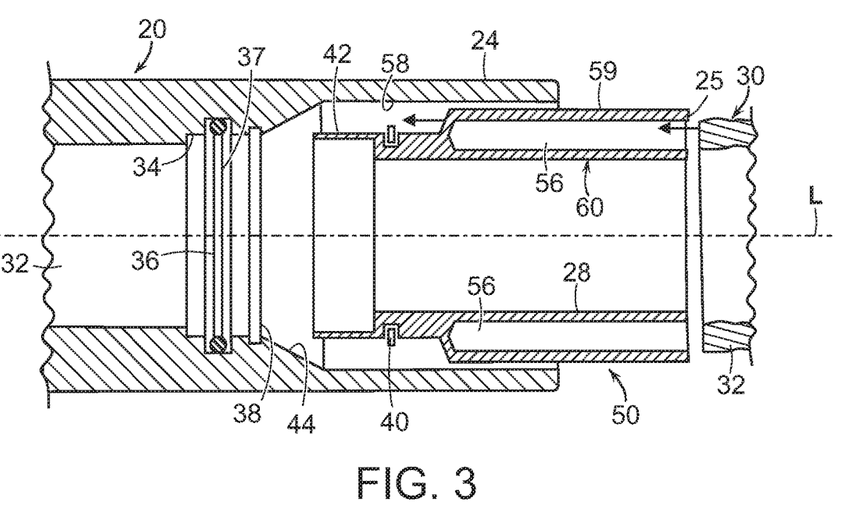
FIG. 3 is a partial lengthwise cross section of the assembly of FIG. 2 in exploded view, wherein an adapter on the end of a hose is being inserted into the bore of a valve.
Figure 4:
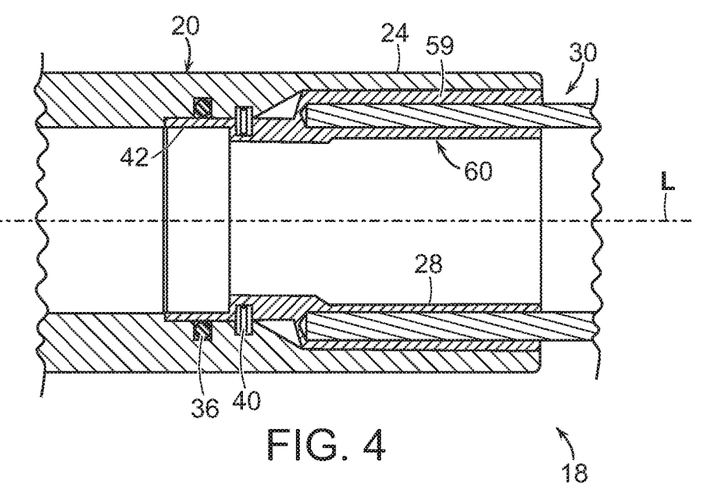
FIG. 4 is a partial cross section of the assembly of FIG. 2.

FIG. 3 is an exploded lengthwise cross section of view of an embodiment of the invention comprising valve 20, adapter 50 and hose 30, shown as they are being mated. FIG. 4 shows the same parts, now attached to each other as an assembly 18 which is attached to hose portion 30. Referring to both FIG. 3 and FIG. 4: Only the inlet end of the valve 20 is shown; that portion of the valve, including the reciprocating shuttle and its mating plug, are downstream the pictured valve portion. Bore 32 of the valve comprises first bore section 34 and larger diameter second bore section 58, both sized and shaped to receive portions of the adapter. A conical section 44 connects the portions 32, 34.

Adapter 50 has an inlet end 60, also referred to as hose end 60, and a discharge end 42, also referred to as the prong end 42. The hose receiving end 60 has a terminus 25 and comprises two spaced apart circumferential inner wall 28 and outer wall 59, which walls define a cylindrical cavity 56. (The spaced apart wall configuration of FIG. 3 illustrates the principles of features of the invention, but it is costly to make. Thus, embodiments which are more preferred include those embodiments described below that comprise one wall and a separate sleeve, also called a ferrule.) When end 32 of hose 30 is inserted into cavity 56, wall 28 (and in the alternative, or in addition, wall 59) is then radially deformed by swaging to decrease the relative spacing between the walls 28, 59. Thus, the end of the hose 30 is mechanically squeezed and grasped by the hose end 60 of adapter 50.

Before mating of the adapter with the inlet end 24 of the valve, a stainless steel retaining ring 40 is set within a circumscribing groove near the second or prong end 42 of the adapter. The retaining ring 40, also familiarly called a snap ring, may be of the spiral type, and is made of spring steel or comparable elastic structural material. When installed, ring 40 is partially contained within the groove of end 42; and the radial outermost portion of ring 40 ring projects beyond the cylindrical exterior surface of the prong end. Also, before assembly of the parts, O-ring 36 is placed within groove 37 that is within the bore 34 of the valve.

When, as indicated by an arrow in FIG. 3, the adapter is then pushed linearly into the bore 58 of the valve body at inlet end 24, that causes retaining ring 40 to be first radially and elastically compressed by contact with conical wall portion 44 within the bore 32, which portion connects the larger bore portion 58 that is near the terminal end of the adapter with a smaller and more interior bore portion 34. Bore 34 is shaped so that it closely fits the outermost portion of prong end 42 of the adapter.

With sufficient force and linear motion of the prong end of the adapter into the bore of the valve body, the groove holding ring 40 reaches the location of retaining ring groove 38. When the grooves become mated or axially (lengthwise)

co-aligned, ring 40 expands radially outwardly into the groove 38 of the smaller bore diameter portion of the valve inlet end, so the ring is contained partially in both groove 38 and the groove of end 44 of the adapter. That prevents further linear motion and thus any disengagement of the two parts 50, 20. During the foregoing insertion step, the outermost portion of the prong end 42 has slid lengthwise within bore 32 to the point where the small slip-fit space between the prong end and the interior surface of bore 34 is sealed against lengthwise fluid flow by means of O-ring 36. Thus air or other fluid can flow from the hose, through the adapter, and through the body of valve 20 without leakage from the flow path that runs through the adapter and valve. When inserted as described, adapter 50 becomes permanently affixed to the valve, because there is no way to access and to disengage retaining ring 40. Thus, the valve is indirectly and permanently affixed to the end of the hose 30. Only insubstantial lengthwise relative movement of the adapter and valve device is possible according to the fit of the retaining ring where it is received within the two mated grooves.

As shown, the bore of the inlet end of the valve body in FIG. 4 is sufficiently long so that the exterior of the valve body inlet end overlies the adapter second wall (and would cover any sleeve, like sleeve 359 in FIG. 9, discussed below). That feature desirably provides a pleasing appearance to the assembly, concealing the swaged exterior portion of the hose end, while also helping to resist any extreme bending moment applied to hose where it is attached to the adapter. In alternative embodiments of the invention, the length of end 24 of the valve may be shortened from that which is shown in FIG. 4, so the adapter is more exposed in the assembly.

Figure 5:
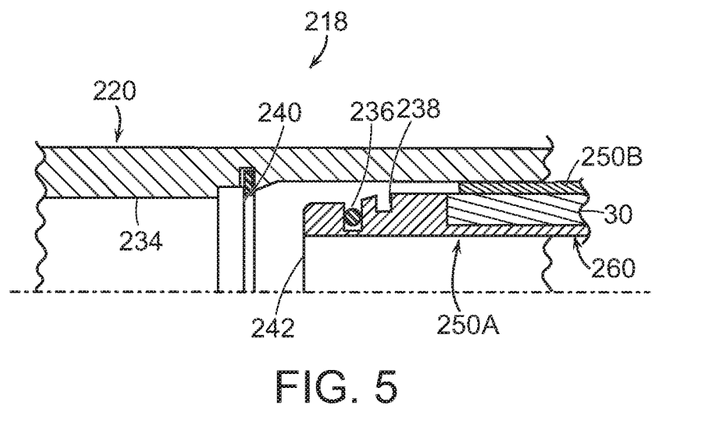
FIG. 5 is a partial cross section similar to the exploded view of FIG. 3, showing an alternative embodiment invention.

FIG. 5 shows in partial lengthwise cross section assembly 218, an alternative embodiment of the invention where, before assembly, retaining ring 240 is contained within a groove in the bore of valve body 220. And the prong end 242 of adapter portion 250A has an O-ring 236 within an exterior surface groove. The prong end 242 also has a second exterior surface groove 238 for receiving the retaining ring 240 when the adapter is linearly inserted sufficiently. In this and other embodiments, more than one O-ring or other seal and associated groove may be present. The hose is secured to the tubular shape portion of end 260 of adapter portion 250A by sleeve/ferrule 250B. This type of hose attachment is described further below.

Figure 6:
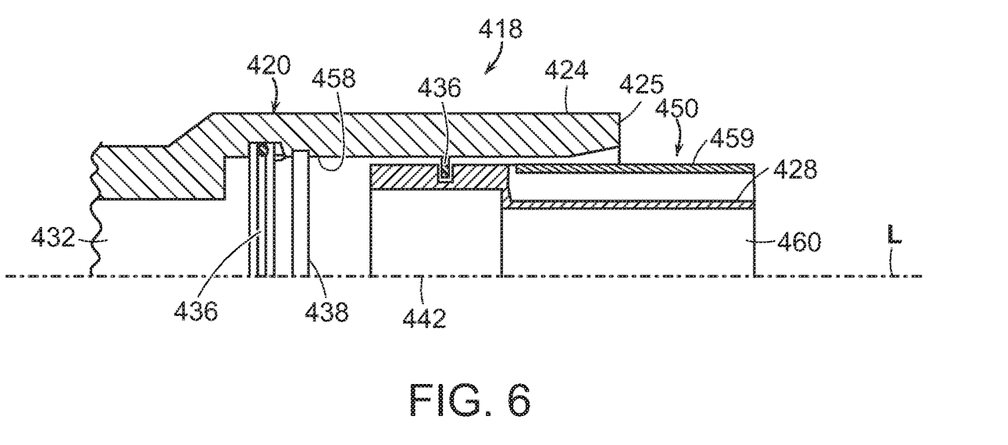
FIG. 6 is a partial cross section similar to the exploded view of FIG. 3, showing another alternative embodiment.

FIG. 6 shows in exploded view assembly 418, comprising an embodiment of adapter that has a bore 432 with a constant diameter bore interior surface portion 458. Interior surface 458 has a groove within which is O-ring 436; the surface also has a groove 438 that is shaped to receive a portion of a retaining ring 436. There is a conical section running from the terminus 425 of valve end 424 into the bore 458, to ease insertion of the retaining ring when it is in place in the groove of the adapter downstream end. The upstream end 460 of adapter 450 comprises an integral interior wall 428 which in a finished assembly is circumscribed by a separate element, namely, sleeve 459. When the hose is in position on the adapter, sleeve 459 is swaged inwardly to compress and hold the hose onto the tubular portion 428 which is within the bore of the hose.

Figure 7:
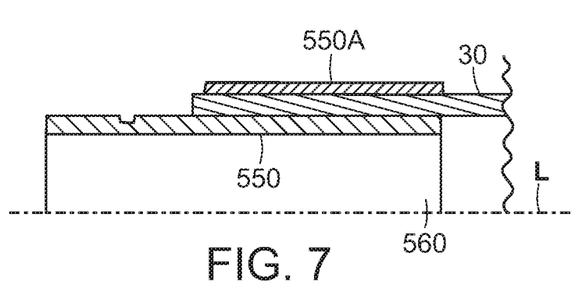
FIG. 7 is a partial cross section of an adapter comprising an exterior sleeve attached to the end of a hose.
Figure 8:
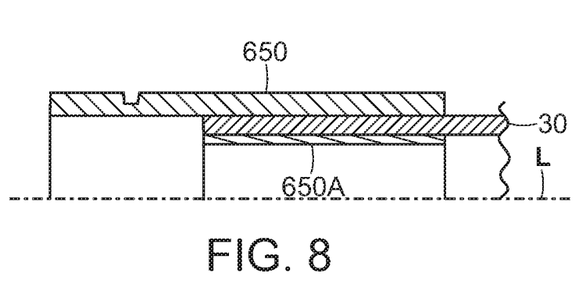
FIG. 8 is a partial cross section of an adapter comprising an exterior sleeve attached to the end of a hose

FIG. 7 and FIG. 8 illustrate in simplified fashion two embodiments comprised of an adapter with sleeve, along with an end of a hose. The configuration shown in FIG. 7 is similar to that just described for FIG. 6. In FIG. 7, adapter 550 comprises a tubular portion 560 which fits within the bore of hose 30. Sleeve 550A, also referred to as a ferrule, after having been slipped around the exterior of the hose was then swaged radially inward to compress and hold the hose on the tubular part, as shown. In FIG. 8, adapter 650 comprises a tubular portion which slides over the exterior of hose 30. Sleeve 650A, also referred to as a ferrule, has been slipped into the bore of the hose and has been swaged radially outwardly to compress and hold the hose on the tubular portion.

Figure 9:
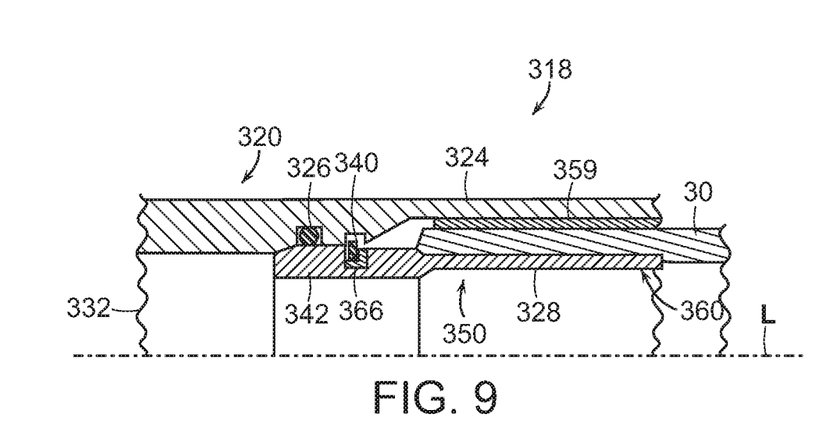
FIG. 9 is a partial cross section similar to the view of FIG. 4 showing an assembly like that of FIG. 5, where the retaining ring is underlain by a L-shape cross section plastic ring.
Figure 10:
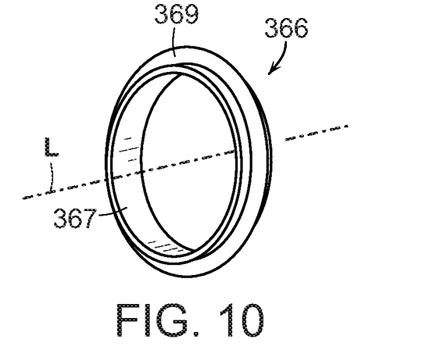
FIG. 10 is a perspective view of the L-shape cross section plastic ring shown in FIG. 7.

FIG. 9 shows in partial lengthwise cross section assembly 318, another embodiment. A first set of features relate to the shape and manner of engagement of the prong end 324 with the bore of the valve 320. The engagement means is similar to that in assembly 18. The prong end 342 of the adapter has a groove that holds retaining ring 340 that, when the parts are assembled, snaps into a mating groove within bore 332. Retaining ring 340 mounts on a backup ring 366 which is within the groove on the exterior of the prong end of the adapter. Backup ring 366, which is made of thermoplastic, has an L shape cross section; it is shown in perspective in FIG. 10. Ring 366 comprises a lengthwise axis extending portion 367 and a radially extending portion 369 that in use is parallel to the edge of the retaining ring groove. It is found that the use of the plastic ring 366 eases assembly of the adapter and valve, during which compressing the retaining ring provides resistance to the insertion step, and also eases rotation of the valve relative to the adapter.

FIG. 9 also shows an adapter 350 having a tubular end which is within the bore of the end of a hose 30. FIG. 9 also shows sleeve 359, a separate element that has been swaged around the hose to hold the hose onto the adapter, as previously described.

A characteristic of a sleeve or adapter portion that has been swaged is that the part/portion will compress the hose locally where the hose is contacted. The nature of swaging in context of the present invention is that the part/portion that is swaged is deformed, and the hose that is typically made of resilient plastic or elastomer is as a result compressed. Thus in the finished assembly, there will be stress in the deformed part/portion. That stress will be either predominately tensile (for the example of a sleeve on the exterior of the hose), or predominately compressive (for the example of a sleeve within the bore of the hose). Most often there will be a surface texturing and slight surface unevenness on the part where it has been contacted by the swaging tool. Other means for deforming a part/portion with the same result as achieved by swaging may be employed.

In another variation, not shown, the external sleeve of the foregoing embodiments may be replaced by one or more circumscribing clamps or other banding structures, known in the art of hose attachment, to hold equivalently the hose onto the end of an adapter. The interior of the end of the valve body may be enlarged or omitted, to accommodate any clamps or attachment structures which have larger exterior dimension than an exemplary exterior sleeves described herein.

Figure 11:
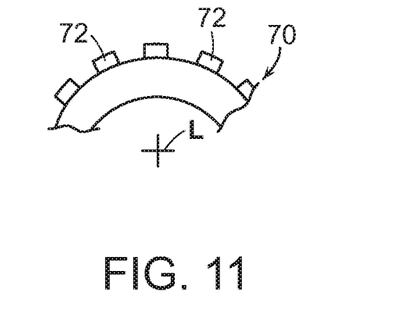
FIG. 11 is a partial end view of a serrated retaining ring.
Figure 12:
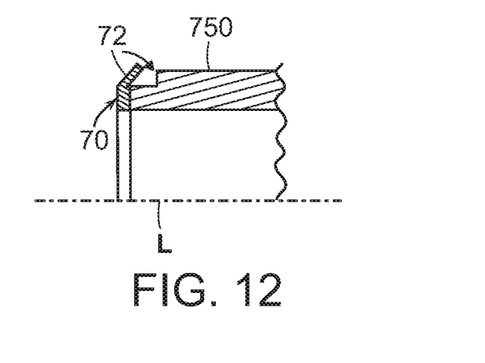
FIG. 12 is a partial lengthwise cross section of the prong end of an adapter having a serrated ring of FIG. 11 attached.
Figure 13:
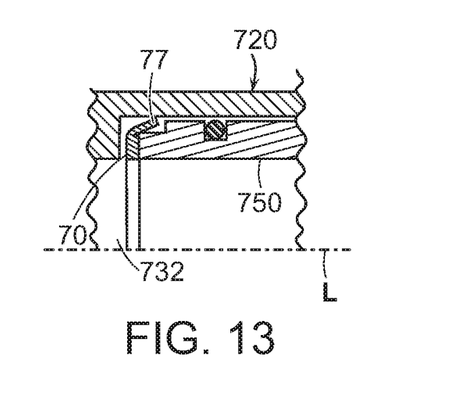
FIG. 13 is a partial lengthwise cross section of the assembly of FIG. 12 after it has been pushed into the bore of a valve body.

In another variation, a retaining ring described herein may be replaced by an equivalent means for securing the parts to each other. One example is to use a plurality of circumferentially extending serrated inclined prongs which dig into the material of the bore of the valve, to thereby prevent any substantial lengthwise movement of the adapter relative to the device. An embodiment of such comprises prongs 72 of a serrated retaining ring 70 of FIG. 11. The ring is shown secured to the downstream end of an adapter 750 in FIG. 12, as by pins or adhesive or weld/solder (none shown). In the FIG. 12 embodiment, when the adapter end is being inserted into the bore of a valve or other device the prongs deflect elastically as indicated by the arrow in FIG. 12. FIG. 13 shows the assembly of FIG. 12 after it has been pushed lengthwise into the bore 732 of the inlet end of valve body 720. When, after the adapter 750 (now shown with an O-ring seal in a groove) reaches its innermost point, and the adapter is retracted slightly, each outward-pressing prong 72 digs into the interior wall of the bore of the device at a point 77, thereby preventing removal of the adapter from the bore of the valve. A ring 70 may be a commercial ring which is made of hardened preferably stainless steel. The metal in the bore of the valve is sufficiently deformable to enable a prong 72 of the ring to dig in. A feature of this embodiment is that no retaining ring grooves are required. In another variation, not shown, the serrated ring has inwardly projecting prongs and is pre-positioned in the bore of the valve and the prongs dig into the exterior surface of the adapter.

A preferred O-ring is made of Buna-N synthetic rubber. Other types of known seals may be used in substitution of the O-ring seals which have been described. For example, a lip seal and a vee-ring seal may be useful. Seals made of other elastomers or of metal may be used. The adapter and valve parts are preferably made of a metal comprising brass alloys, aluminum alloys, or corrosion resisting steel alloys. Structural plastic may be alternatively be used for most parts.

The invention permits the use of known tools and technology for swaging the adapter to the hose, and after attachment of an adapter to the end of a hose, the adapter can be easily inserted manually into the bore of the valve body. A feature of certain embodiments of the invention is that during use, the valve body may be rotated around the length axis L relative to the adapter, thus making convenient the user's choice of orientation of the tabs of the valve, or other features which some other valve or device may have. Such rotation will be facilitated by use of the L-shape cross section plastic ring.

While the invention solves the problem of attaching a valve having interior parts that prevent the use of conventional swaging tools and methodology, the invention may be used to hose-attach components other than a valve type which is used as an example in this description.

The invention, with explicit and implicit variations and advantages, has been described and illustrated with respect to several embodiments. Those embodiments should be considered illustrative and not restrictive. Any use of words such as "preferred" and variations suggest a feature or combination which is desirable but which is not necessarily mandatory. Thus embodiments lacking any such preferred feature or combination may be within the scope of the claims which follow. Persons skilled in the art may make various changes in form and detail of the invention embodiments which are described, without departing from the spirit and scope of the claimed invention.

What is claimed is:

1. An assembly having a length, for flowing water or other fluid, comprising a device connected to an adapter:
    the device having a first end with a terminus, a first bore having a first diameter running lengthwise from the terminus, and an interior surface portion;
    the adapter having a first end shaped for attachment to the end of a hose and a second end having an exterior surface portion that is cylindrical in shape and runs lengthwise;
    said piece of hose having an end with a bore and an associated exterior surface, the hose end fastened to the first end of the adapter;
    wherein the second end of the adapter is in mating engagement with the first end of the device so that said exterior surface portion of the adapter is positioned within and mated with said interior surface portion of the bore of the device;
    a retaining ring for holding the adapter second end and the device interior surface portion in said mating engagement; and,
    a seal for preventing lengthwise flow of liquid at the location where the exterior surface portion of the adapter and the interior surface portion of the device are mated with each other;
    the device interior surface portion having a first circumscribing groove shaped to receive a first portion of said retaining ring; and
    the adapter exterior surface portion having a second circumscribing groove shaped to receive a second portion of said retaining ring;
    wherein the first and second circumscribing grooves are radially mated and co-aligned with each other within the assembly; and,
    wherein, the retaining ring is partially contained within each of said mated first and second circumscribing grooves, thereby preventing lengthwise relative motion of the device and the adapter.

2. The assembly of claim 1 wherein the retaining ring is inaccessible from either the bore of the adapter or the exterior of the device.

3. The assembly of claim 1 wherein the device is a valve having a plug lying along the lengthwise axis of the assembly and a shuttle that selectively moves lengthwise to mate with the plug and thereby block said flowing of water of other fluid through the assembly.

4. The assembly of claim 3 wherein the first end of the adapter comprises two-spaced apart circumferential walls defining a cavity and the hose is positioned within said cavity and compressed between said walls.

5. The assembly of claim 1 further comprising a sleeve, the sleeve surrounding and compressing the exterior surface portion of the hose and holding the hose in attachment to the first end of the adapter.

6. The assembly of claim 5 wherein the first end of the adapter comprises a tubular portion positioned within the bore of the piece of hose; and wherein said piece of hose is compressed between said sleeve and said tubular portion.

7. The assembly of claim 5 wherein the bore of the inlet end of the device has a length that is longer than the length of the sleeve, so the sleeve is contained within the bore of the inlet end.

8. The assembly of claim 1 further comprising a sleeve positioned within the bore of the hose; wherein the first end of the adapter comprises a tubular portion positioned around the exterior surface portion of the piece hose; and wherein the hose is compressed between the sleeve and tubular portion.

9. The assembly of claim 1 wherein the seal is an O-ring seal positioned within a circumscribing groove in either the device interior surface portion or the adapter exterior surface portion.

10. The assembly of claim 1 wherein said interior surface portion of the bore of the device is spaced apart from the terminus of the first end of the device; further comprising:
    a second interior surface portion of the bore having a second diameter that is larger than said first diameter; and a conical transition section connecting said interior surface portions.

11. The assembly of claim 10 wherein said seal blocks lengthwise fluid flow at the location of said bore interior surface portion having said first diameter.

12. The assembly of claim 1 wherein said interior surface portion of bore comprises a conical section at the terminus of the first end of the device.

13. The assembly of claim 1 further comprising an L-shape cross section plastic ring positioned within said second circumscribing groove of the adapter exterior surface portion, so that a portion of said plastic ring underlies said second portion of the retaining ring.

14. A method of connecting a hose to a device for enabling flow of liquid through the hose and the device; the hose having an end, a bore, and an exterior surface; which comprises:
 providing said device, the device having a length, a first end with a terminus, and a bore running from said terminus, the bore shaped for receiving an end of an adapter and having a feature for engaging a portion of a retaining ring;
 providing an adapter, the adapter having a length, a bore running lengthwise, a first end shaped for attachment to said hose, and a second end shaped for fitting within said bore of the device, the second end shaped for receiving or being attached to a portion of said retaining ring;
 wherein either said device bore or said second end of the adapter has a first circumscribing groove shaped to receive a seal;
 providing and securing said retaining ring to either said bore of the device or to said second end of the adapter;
 providing and placing a seal in said first circumscribing groove;
 forming an assembly by mating through lengthwise relative movement the second end of the adapter with the first end of the device;
 wherein a portion of the retaining ring engages said feature for engaging within the bore of the device and the second end of said adapter in a way which prevents further substantial lengthwise movement of the adapter relative to the device; and
 providing said hose and fastening an end thereof to the first end of the adapter prior to or after said forming step.

15. The method of claim 14, wherein said device feature for engaging comprises a first circumscribing groove shaped to receive a portion of the retaining ring;
 wherein the adapter has a second end comprising an exterior surface portion that is cylindrical the exterior surface portion having a second circumscribing groove shaped to receive a portion of the retaining ring;
 wherein the retaining ring is first secured to the adapter by positioning a portion thereof in said first circumscribing groove thereof; and,
 inserting the second end of the adapter lengthwise into said bore of the first end of the device, so a portion of the retaining ring is received in said first circumscribing groove, thereby to prevent said further substantial lengthwise movement.

16. The method of claim 15, wherein either the second end of the adapter or the bore of the first end of the device has a third circumscribing groove, further comprising:
 providing a seal;
 before the inserting step, placing the seal within said third circumscribing groove.

17. The method of claim 14 wherein the end of the hose is fastened to the first end of the adapter by compressing the end of the hose against or within said first adapter end.

18. An assembly, having a length, for flowing water or other liquid, comprising:
 a device mated with and connected to an adapter;
 the device having an inlet end with a terminus and an interior surface portion that is part of a cylindrical bore of the device running from the terminus;
 the adapter having a first end shaped for attachment to a piece of hose and a second end having an exterior surface portion that is cylindrically shaped, for mating with the device;
 a piece of hose fastened to the first end of the adapter;
 a retaining ring positioned within the assembly, for preventing lengthwise movement of the adapter relative to the mated device; and,
 a seal for preventing lengthwise flow of liquid within the assembly between a surface of the device and a mating surface of the adapter;
 wherein the device interior surface portion is shaped to receive and engage said retaining ring;
 wherein the second end of the adapter is mated with the first end of the device so that said exterior surface portion of the adapter is mated with and positioned within said interior surface portion of the device; and,
 wherein, said retaining ring is both engaged with the second end of the adapter to prevent lengthwise movement and is-interlocked with the interior surface of the device.

19. The assembly of claim 18 wherein said retaining ring comprises a plurality of elastic prongs and is interlocked with the interior surface of the device by prong ends which are dug into said interior surface.

20. The assembly of claim 18 wherein the adapter has a groove on the exterior surface portion and the retaining ring is engaged with the adapter by being partially positioned within said groove.

* * * * *